USO12363556B2

(12) United States Patent
Sun et al.

(10) Patent No.: US 12,363,556 B2
(45) Date of Patent: Jul. 15, 2025

(54) RADIO BROADCAST BEAM COVERAGE ENHANCEMENT METHOD AND APPARATUS

(71) Applicant: HUAWEI TECHNOLOGIES CO., LTD., Shenzhen (CN)

(72) Inventors: Shaofeng Sun, Shanghai (CN); Chengzhi Zhu, Shanghai (CN); Tianyu Liu, Shanghai (CN); Yongzhao Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 769 days.

(21) Appl. No.: 17/707,194

(22) Filed: Mar. 29, 2022

(65) Prior Publication Data

US 2022/0225122 A1 Jul. 14, 2022

Related U.S. Application Data

(63) Continuation of application No. PCT/CN2020/113837, filed on Sep. 7, 2020.

(30) Foreign Application Priority Data

Sep. 30, 2019 (CN) .......................... 201910944464.0

(51) Int. Cl.
 *H04W 16/28* (2009.01)
 *H04L 5/00* (2006.01)
(52) U.S. Cl.
 CPC .......... *H04W 16/28* (2013.01); *H04L 5/0023* (2013.01); *H04L 5/0048* (2013.01); *H04L 5/006* (2013.01)
(58) Field of Classification Search
 CPC .... H04W 16/28; H04L 5/0023; H04L 5/0048; H04L 5/006
 See application file for complete search history.

(56) References Cited

U.S. PATENT DOCUMENTS 10,779,182 B2 * 9/2020 Yiu ....................... H04W 24/10
10,869,338 B2 * 12/2020 Jung .................... H04W 48/08
(Continued)

FOREIGN PATENT DOCUMENTS

CN 109474939 A 3/2019
CN 109802757 A 5/2019
(Continued)

OTHER PUBLICATIONS

Extended European Search Report issued in corresponding European Application No. 20871996.3, dated Sep. 26, 2022, pp. 1-8.
(Continued)

*Primary Examiner* — Hai V Nguyen
(74) *Attorney, Agent, or Firm* — HAUPTMAN HAM, LLP

(57) ABSTRACT

This application provides a radio broadcast beam coverage enhancement method and apparatus. In some embodiments, the method includes: a base station determines at least one target traffic beam, where in an area covered by the at least one target traffic beam, data channel quality of at least one terminal is higher than a first threshold, and broadcast channel quality is lower than a second threshold. The base station transmits N first SSB beams in at least one BWP, where the N first SSB beams cover the area covered by the at least one target traffic beam, and N is an integer greater than or equal to 1. According to the foregoing method in this application, the at least one BWP can be configured for the area covered by the target traffic beam, to enhance an SSB signal in the area, so that the terminal can access a cell.

14 Claims, 13 Drawing Sheets

(56) References Cited

U.S. PATENT DOCUMENTS

| | | | |
|---|---|---|---|
| 10,880,867 B2* | 12/2020 | Islam | H04L 5/001 |
| 11,129,164 B2* | 9/2021 | Wu | H04W 24/08 |
| 11,184,080 B2* | 11/2021 | Nagaraja | H04B 7/088 |
| 11,330,575 B2* | 5/2022 | Lin | H04L 1/0026 |
| 11,363,480 B2* | 6/2022 | Yi | H04W 72/542 |
| 11,546,816 B2* | 1/2023 | Basu Mallick | H04W 36/305 |
| 11,659,600 B2* | 5/2023 | Cozzo | H04L 1/08 370/328 |
| 11,785,520 B2* | 10/2023 | Gao | H04W 36/06 370/331 |
| 11,818,766 B2* | 11/2023 | Agiwal | H04W 74/0833 |
| 11,832,273 B2* | 11/2023 | Lin | H04W 52/0235 |
| 11,838,942 B2* | 12/2023 | Jeon | H04W 74/002 |
| 11,871,397 B2* | 1/2024 | Cirik | H04W 72/23 |
| 11,902,846 B2* | 2/2024 | Soldati | H04B 7/0695 |
| 12,010,634 B2* | 6/2024 | Jeon | H04W 74/0866 |
| 12,069,611 B2* | 8/2024 | Lee | H04B 7/0404 |
| 12,075,417 B2* | 8/2024 | Kim | H04L 25/0204 |
| 2017/0223690 A1 | 8/2017 | Zeng et al. | |
| 2019/0081691 A1* | 3/2019 | Nagaraja | H04W 36/305 |
| 2019/0159175 A1* | 5/2019 | Islam | H04W 56/001 |
| 2019/0159261 A1* | 5/2019 | Jung | H04W 72/542 |
| 2019/0190582 A1* | 6/2019 | Guo | H04L 1/0061 |
| 2019/0230550 A1* | 7/2019 | Yiu | H04W 24/10 |
| 2019/0254030 A1* | 8/2019 | Wu | H04W 48/12 |
| 2019/0357292 A1* | 11/2019 | Cirik | H04W 76/19 |
| 2020/0029315 A1* | 1/2020 | Lin | H04W 52/0216 |
| 2020/0045745 A1* | 2/2020 | Cirik | H04W 74/0833 |
| 2020/0221485 A1* | 7/2020 | Cirik | H04L 25/0224 |
| 2020/0314711 A1* | 10/2020 | Basu Mallick | H04W 36/00838 |
| 2020/0374960 A1* | 11/2020 | Deenoo | H04W 76/19 |
| 2021/0168862 A1* | 6/2021 | Murray | H04W 74/0816 |
| 2021/0282143 A1* | 9/2021 | Lee | H04W 52/343 |
| 2021/0314917 A1* | 10/2021 | Lee | H04B 7/0404 |
| 2021/0329002 A1* | 10/2021 | Huh | G06F 21/32 |
| 2021/0336688 A1* | 10/2021 | Lee | H04W 4/40 |
| 2021/0337453 A1* | 10/2021 | Gao | H04B 7/0639 |
| 2021/0366088 A1* | 11/2021 | Chae | G06T 5/90 |
| 2022/0110039 A1* | 4/2022 | Soldati | H04W 28/082 |
| 2022/0110181 A1* | 4/2022 | Miao | H04L 1/1822 |
| 2022/0124814 A1* | 4/2022 | Uchino | H04W 74/004 |
| 2022/0124828 A1* | 4/2022 | Uchino | H04W 74/0836 |
| 2022/0141869 A1* | 5/2022 | Jeon | H04W 72/0446 370/329 |
| 2022/0150937 A1* | 5/2022 | Kim | H04W 52/52 |
| 2022/0167279 A1* | 5/2022 | Zhou | H04W 52/146 |
| 2022/0174512 A1* | 6/2022 | Rune | H04W 24/10 |
| 2022/0232536 A1* | 7/2022 | Lin | H04W 52/0235 |
| 2023/0138567 A1* | 5/2023 | Gao | H04B 7/0413 370/329 |
| 2023/0284200 A1* | 9/2023 | Cirik | H04L 5/0023 375/267 |
| 2023/0309080 A1* | 9/2023 | Cirik | H04W 72/23 |
| 2024/0031901 A1* | 1/2024 | Gao | H04W 76/19 |
| 2024/0205738 A1* | 6/2024 | Shilov | H04W 4/70 |
| 2024/0259257 A1* | 8/2024 | Cirik | H04B 7/06966 |
| 2024/0430820 A1* | 12/2024 | Jeon | H04W 74/0866 |
| 2025/0007665 A1* | 1/2025 | Lei | H04W 72/51 |

FOREIGN PATENT DOCUMENTS

| | | | | |
|---|---|---|---|---|
| EP | 3817434 A1 * | 5/2021 | | H04W 24/02 |
| EP | 4243325 A2 * | 9/2023 | | H04B 7/02 |
| EP | 4344334 A2 * | 3/2024 | | H04W 56/00 |
| WO | 2019099890 A1 | 5/2019 | | |
| WO | WO-2019102264 A1 * | 5/2019 | | H04W 48/08 |

OTHER PUBLICATIONS

Ericsson, TP to TR 37.816 on Load Information per SSB beam coverage area. 3GPP TSG-RAN WG3 #104, Reno, Nevada, US, May 13-May 17, 2019, R3-193065, 3 pages.

LG Electronics, Discussion on group common PDCCH. 3GPP TSG RAN WG1 NR AH1801, Vancouver, Canada Jan. 22-26, 2018, R1-1800373, 15 pages.

3GPP TS 38.213 V15.7.0 (Sep. 2019), 3rd Generation Partnership Project; Technical Specification Group Radio Access Network; NR; Physical layer procedures for control(Release 15), 108 pages.

Ericsson, Load sharing and load balancing optimization. 3GPP TSG-RAN WG3 #103, Athens, Greece, Feb. 25-Mar. 1, 2019, R3-190824, 6 pages.

International Search Report issued in corresponding International Application No. PCT/CN2020/113837, dated Dec. 3, 2020, pp. 1-12.

Chinese Office Action issued in corresponding Chinese Application No. 201910944464.0, dated Aug. 30, 2021, pp. 1-8.

* cited by examiner

RADIO BROADCAST BEAM COVERAGE ENHANCEMENT METHOD AND APPARATUS

CROSS-REFERENCE TO RELATED APPLICATIONS

This application is a continuation of International Application No. PCT/CN2020/113837, filed on Sep. 7, 2020, which claims priority to Chinese Patent Application No. 201910944464.0, filed on Sep. 30, 2019. The disclosures of the aforementioned applications are hereby incorporated by reference in their entireties.

TECHNICAL FIELD

This application relates to the wireless communication field, and more specifically, to a radio broadcast beam coverage enhancement method and apparatus.

BACKGROUND

Multiple-input multiple-output (MIMO) is applicable to an orthogonal frequency division multiplexing (OFDM) system, uses a beamforming (BF) technology to form a narrow beam, and is a key technology to improve coverage, improve spatial division multiplexing, reduce interference, and improve spectral efficiency. In a 4G era, broadcast beams are wide beams, and coverage is limited before traffic beams are limited. In a 5G era, broadcast beams are narrow beams, and cover an entire cell through beam scanning. However, a quantity of synchronization signal block (SSB) beams is limited, and the 3rd Generation Partnership Project (3GPP) defines a quantity of new radio (NR) SSB beams of an initial downlink bandwidth part (BWP). For an N41 frequency band and a 3G to 6G TDD (TDD) frequency band, a maximum quantity of SSB beams is 8. For a frequency division duplex (FDD) spectrum lower than 3 GHz, a maximum quantity of SSB beams is 4.

Therefore, if SSBs form a narrow beam, a coverage envelope of the beam has a relatively small horizontal or vertical range, and is poorer than an envelope of a data channel in some directions. If SSBs form a wide beam, a small BF gain is obtained. In conclusion, coverage of the SSB beam is still poorer than coverage of the data channel, and compared with coverage of a traffic channel, the coverage of the SSB beam can still be improved.

SUMMARY

This application provides a radio broadcast beam coverage enhancement method and apparatus, to enhance coverage of an SSB signal.

According to a first aspect, this application provides a radio broadcast beam coverage enhancement method, including: A base station determines at least one target traffic beam, where in an area covered by the at least one target traffic beam, data channel quality of at least one terminal is higher than a first threshold, and broadcast channel quality is lower than a second threshold. The base station transmits N first SSB beams in at least one BWP, where the N first SSB beams cover the area covered by the at least one target traffic beam, and N is an integer greater than or equal to 1.

Herein, a BWP includes a downlink BWP and an uplink BWP corresponding to the downlink BWP. The first SSB beam and a Common PDCCH are transmitted in the downlink BWP.

Based on this solution, an area in which a service signal is strong and an SSB signal is weak can be determined, and the at least one BWP can be configured to enhance the SSB signal in the area, so that a terminal device can access a cell.

In a possible implementation, the at least one target traffic beam includes a first target traffic beam, for the first target traffic beam, the base station performs data transmission with K terminals by using the first target traffic beam, a ratio of a quantity of terminals whose data channel quality is higher than the first threshold to K is greater than a first preset ratio, and a ratio of a quantity of terminals whose broadcast channel quality is lower than the first threshold to K is greater than a second preset ratio.

Based on this solution, the at least one target traffic beam can be determined based on data channel quality and broadcast channel quality that are of a plurality of terminals, so that a transmitted SSB can accurately cover an area with poor broadcast channel quality.

In a possible implementation, the data channel quality is represented by an SRS measurement result, and the broadcast channel quality is represented by an SSB measurement result.

Based on this solution, the data channel quality can be determined based on the SRS measurement result, and the broadcast channel quality can be determined based on the SSB measurement result, so that the at least one target traffic beam can be accurately determined.

In a possible implementation, the SRS measurement result includes at least one of an SRS RSRP and an SRS SINR; and the SSB measurement result includes an SSB RSRP.

Based on the method, the SRS measurement result can be determined based on the SRS RSRP or the SRS SINR, and the SSB measurement result can be determined based on the SSB RSRP, to learn of the data channel quality and the broadcast channel quality that correspond to the target traffic beam.

In a possible implementation, for the first target traffic beam, a ratio of a quantity of terminals that perform redirection and/or handover from a 5G network to a 4G network to K is greater than a third preset ratio.

Based on this solution, the broadcast channel quality that corresponds to the first target traffic beam can be accurately determined based on information about whether the terminals in the first target traffic beam perform redirection from a 5G network to a 4G network or perform handover from a 5G network to a 4G network.

In a possible implementation, the method includes:
an SSB includes at least one second SSB beam;
the at least one second SSB beam and the N first SSB beams do not completely overlap on a frequency domain resource; and
the SSB measurement result includes a measurement result of the at least one second SSB beam.

Based on this solution, frequencies of the first SSB beam configured by the base station and the preconfigured second SSB beam do not completely overlap, to avoid interference between the first SSB beam and the second SSB beam, so that the terminal can perform scanning from a low frequency to a high frequency, and can access a cell by using an SSB beam with a stronger SSB signal.

In a possible implementation, the first SSB beam is further used to transmit a common physical downlink control channel Common PDCCH, and the second SSB beam is further used to transmit a Common PDCCH; an offset that is in a BWP to which the first SSB beam belongs and that is between a start position of a resource block for transmitting the Common PDCCH and a start position of a resource block for transmitting the SSB is the same as or different from an offset that is in a BWP to which the second beam belongs and that is between a start position of a resource block for transmitting the Common PDCCH and a start position of a resource block for transmitting the SSB; and a time resource that is in the BWP to which the first SSB beam belongs and that is for transmitting the Common PDCCH is the same as or different from a time resource that is in the BWP to which the second SSB beam belongs and that is for transmitting the Common PDCCH.

Based on this solution, the BWP configured by the base station can meet a specification of the terminal, and the terminal can access, be handed over to, or camp on a cell based on the BWP configured by the base station.

According to a second aspect, an apparatus is provided. The apparatus provided in this application has a function of implementing actions of the base station in the foregoing method aspect, and includes a corresponding means configured to perform steps or functions described in the foregoing method aspect. The steps or functions may be implemented by software, hardware (such as a circuit), or a combination of hardware and software.

In a possible design, the apparatus includes one or more processors and a communication unit. The one or more processors are configured to support the apparatus in performing a corresponding function of the base station in the foregoing method, for example, determining at least one target traffic beam in a plurality of traffic beams for transmitting a service signal. The communication unit is configured to support the apparatus in communicating with another device, to implement a receiving function and/or a sending function, for example, transmitting a first SSB beam.

Optionally, the apparatus may further include one or more memories. The memory is configured to be coupled to the processor, and the memory stores program instructions and/or data necessary for the apparatus. The one or more memories may be integrated with the processor, or may be disposed independent of the processor. This is not limited in this application.

The apparatus may be a base station, a gNB, a TRP, or the like. The communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver or an input/output circuit to receive and send a signal, and the memory is configured to store a computer program. The processor is configured to run the computer program in the memory, to enable the apparatus to perform the method completed by the base station in any one of the first aspect or the possible implementations of the first aspect.

According to a third aspect, a computer-readable storage medium is provided, and is configured to store a computer program. The computer program includes instructions used to perform the method in any one of the first aspect or the possible implementations of the first aspect.

According to a fourth aspect, a computer program product is provided. The computer program product includes computer program code. When the computer program code is run on a computer, the computer is enabled to perform the method in any one of the first aspect or the possible implementations of the first aspect.

DESCRIPTION OF EMBODIMENTS

Figure 1:
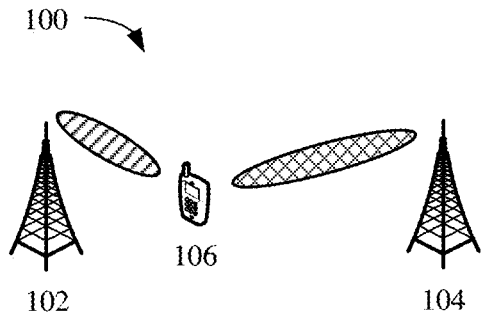
FIG. 1 is a schematic diagram of a communication system of a radio broadcast beam coverage enhancement method applicable to an embodiment of this application.

The following describes technical solutions of this application with reference to accompanying drawings.

The technical solutions of embodiments of this application may be applied to various communication systems, for example, a long term evolution (LTE) system, a worldwide interoperability for microwave access (WiMAX) communication system, a future 5th generation (5G) system such as a new radio access technology (NR), and a future communication system such as a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In embodiments of this application, information, a signal, a message, or a channel may be interchangeably used sometimes. It should be noted that expressed meanings are consistent when differences are not emphasized. "Of", "corresponding, relevant", and "corresponding" may be interchangeably used sometimes. It should be noted that meanings expressed by the terms are consistent when differences between the terms are not emphasized.

In embodiments of this application, a subscript such as in $W_1$ may be mistakenly written in a non-subscript form such as W1 sometimes, and expressed meanings are consistent when differences are not emphasized.

A network architecture and a service scenario that are described in embodiments of this application are intended to describe the technical solutions of embodiments of this application more clearly, and do not constitute a limitation on the technical solutions provided in embodiments of this application. A person of ordinary skill in the art may know that with evolution of the network architecture and emergence of new service scenarios, the technical solutions provided in embodiments of this application are also applicable to similar technical problems.

Embodiments of this application may be applied to a time division duplex (TDD) scenario. Embodiments of this application may be applied to a conventional typical network or a future UE-centric network. A non-cell network architecture is introduced to the UE-centric network. To be specific, a large quantity of small cells are deployed in a specific area to form a hyper cell, and each small cell is a transmission point (TP) or a TRP of the hyper cell, and is connected to a centralized controller. When UE moves in the hyper cell, a network side device selects a new sub-cluster for the UE in real time to serve the UE, to avoid a real cell handover, and implement UE service continuity. The network side device includes a wireless network device. Alternatively, in the UE-centric network, a plurality of network side devices such as small cells may have independent controllers such as distributed controllers. Each small cell can independently schedule a user, and information is exchanged between small cells for a long time, so that the small cells can provide a coordinated service for the UE flexibly to some extent.

In embodiments of this application, different base stations may be base stations having different identifiers, or may be base stations that have a same identifier and that are deployed at different geographical locations. Before being deployed, a base station does not know whether the base station is related to a scenario to which embodiments of this application are applied. Therefore, before being deployed, the base station or a baseband chip needs to support the method provided in embodiments of this application. It may be understood that the foregoing base stations having different identifiers may have base station identifications, cell identifiers, or other identifiers.

In embodiments of this application, an NR network scenario in a wireless communication network is used to describe some scenarios. It should be noted that the solutions of embodiments of this application may be further applied to another wireless communication network, and a corresponding name may also be replaced with a name of a corresponding function in the another wireless communication network.

For ease of understanding embodiments of this application, a communication system shown in FIG. 1 is first used as an example to describe in detail a communication system applicable to embodiments of this application. FIG. 1 is a schematic diagram of a communication system 100 of a radio broadcast beam coverage enhancement method applicable to an embodiment of this application. As shown in FIG. 1, the communication system 100 includes a network device 102 and a terminal device 106. The network device 102 may have a plurality of antennas, and the terminal device may also have a plurality of antennas. Optionally, the communication system may further include a network device 104, and the network device 104 may also have a plurality of antennas.

It should be understood that the network device 102 or the network device 104 may further include a plurality of components (for example, a processor, a modulator, a multiplexer, a demodulator, or a demultiplexer) related to signal sending and receiving.

The network device is a device having a wireless transceiver function or a chip that may be disposed in the device. The device includes but is not limited to: an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), or an access point (AP), a wireless relay node, a wireless backhaul node, a transmission point (transmission reception point (TRP) or transmission point (TP)), or the like in a wireless fidelity (Wi-Fi) system. Alternatively, the device may be a gNB or a transmission point (TRP or TP) in a 5G system, such as an NR system, or one antenna panel or a group of antenna panels (including a plurality of antenna panels) of a base station in the 5G system, or may be a network node that constitutes a gNB or a transmission point, for example, a baseband unit (BBU), or a distributed unit (DU).

In some deployments, the gNB may include a centralized unit (CU) and a DU. The gNB may further include a radio frequency unit (RU). The CU implements a part of functions of the gNB, and the DU implements a part of functions of the gNB. For example, the CU implements functions of a radio resource control (RRC) layer and a packet data convergence protocol (PDCP) layer, while the DU implements functions of a radio link control (RLC) layer, a media access control (MAC) layer, and a physical (PHY) layer. Information at the RRC layer finally becomes information at the PHY layer or is transformed from information at the PHY layer. Therefore, in such an architecture, it may be considered that higher layer signaling such as RRC layer signaling or PHCP layer signaling is sent by the DU or is sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in embodiments of this application. The terminal device having a wireless transceiver function and a chip that may be disposed in the terminal device are collectively referred to as terminal devices in this application.

In the communication system 100, the network device 102 and the network device 104 each may communicate with a plurality of terminal devices (for example, the terminal device 106 shown in the figure). The network device 102 and the network device 104 may communicate with one or more terminal devices similar to the terminal device 106. However, it should be understood that a terminal device communicating with the network device 102 and a terminal device communicating with the network device 104 may be the same or may be different. The terminal device 106 shown in FIG. 1 may communicate with the network device 102 and the network device 104, but this shows only a possible scenario. In some scenarios, the terminal device may communicate with only the network device 102 or the network device 104. This is not limited in this application.

It should be understood that FIG. 1 is merely a simplified schematic diagram used as an example for ease of understanding. The communication system may further include another network device or another terminal device that is not shown in FIG. 1.

The following describes in detail embodiments of this application with reference to the accompanying drawings.

It should be understood that the technical solutions in this application may be applied to a wireless communication system, for example, the communication system 100 shown in FIG. 1. The communication system may include at least one network device and at least one terminal device, and the network device and the terminal device may communicate with each other through a wireless air interface. For example, the network device in the communication system may correspond to the network device 102 and the network device 106 shown in FIG. 1, and the terminal device may correspond to the terminal device 104 shown in FIG. 1.

Without loss of generality, the following describes embodiments of this application in detail by using an interaction process between a terminal device and a network device as an example. The terminal device may be a terminal device that is in a wireless communication system and that has a wireless connection relationship with the network device. It may be understood that the network device and a plurality of terminal devices that are in the wireless communication system and that have wireless connection relationships with the network device may transmit an SSB based on a same technical solution. This is not limited in this application.

Figure 2:
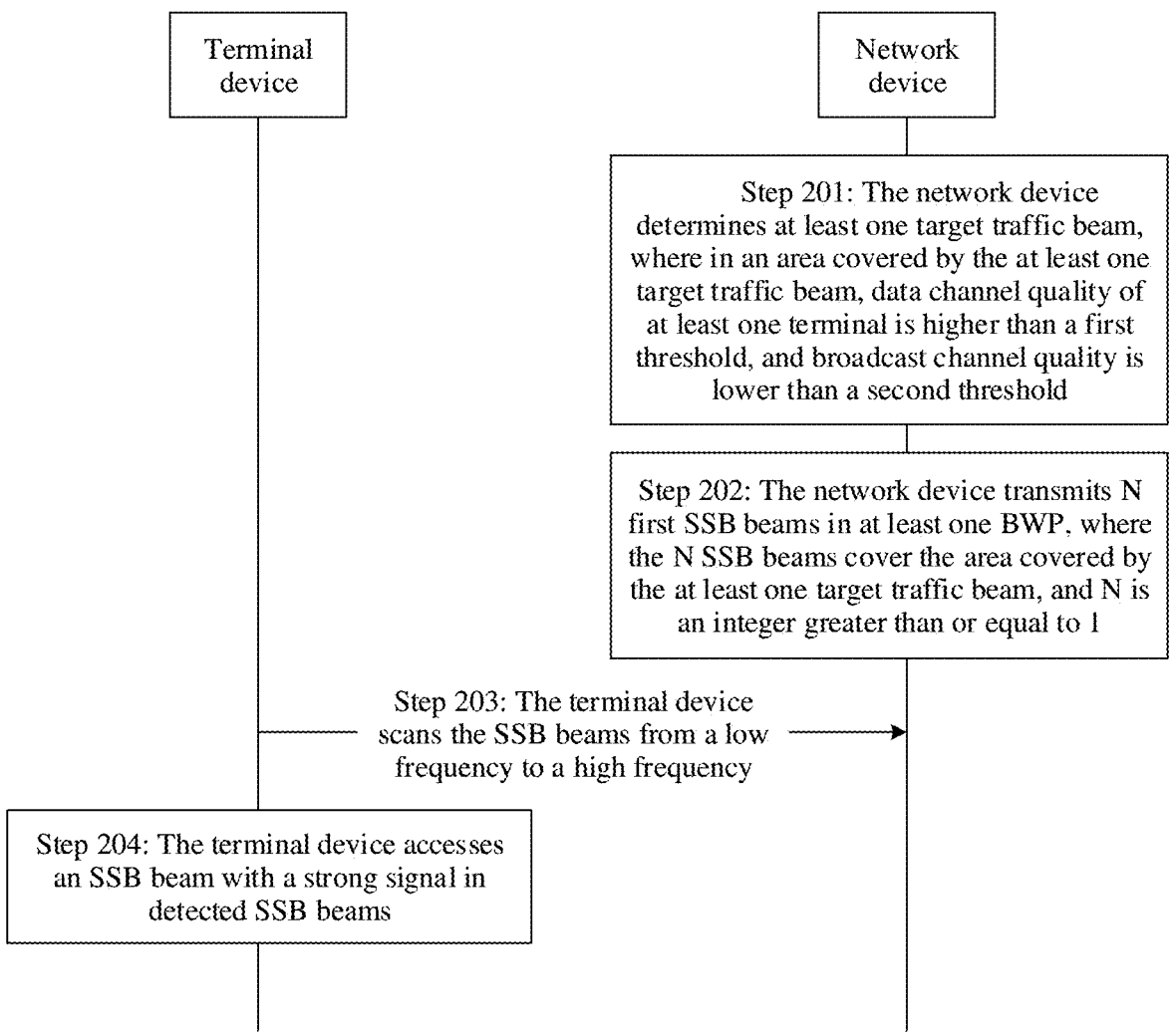
FIG. 2 is a schematic flowchart of a radio broadcast beam coverage enhancement method according to an embodiment of this application.

FIG. 2 is a schematic flowchart of a radio broadcast beam coverage enhancement method 200 according to an embodiment of this application shown from a perspective of device interaction. As shown in FIG. 2, the method 200 may include the following steps.

Step 201: A network device determines at least one target traffic beam, where in an area covered by the at least one target traffic beam, data channel quality of at least one terminal is higher than a first threshold, and broadcast channel quality is lower than a second threshold.

The first threshold and the second threshold herein may be customized. For example, the first threshold is set to −90 dBm, and the second threshold is set to −100 dBm. This is not specifically limited in this application.

It should be noted that the first threshold needs to be used to ensure the data channel quality of the terminal, so that the terminal sends service data based on the data channel, and the second threshold needs to be used to ensure the broadcast channel quality of the terminal, so that the terminal can access, be handed over to, or camp on a cell based on the broadcast channel.

Step 202: The network device transmits N first SSB beams in at least one BWP, where the N first SSB beams cover the area covered by the at least one target traffic beam, and N is an integer greater than or equal to 1.

Herein, that the N first SSB beams cover the area covered by the at least one target traffic beam may be that one first SSB beam covers an area covered by one target traffic beam, may be that one first SSB beam covers areas covered by two or more target traffic beams, or may be that two first SSB beams cover an area covered by one target traffic beam. This is not specifically limited in this application.

Herein, a BWP includes a downlink BWP and an uplink BWP corresponding to the downlink BWP. The first SSB beam and a Common PDCCH are transmitted in the downlink BWP. The at least one BWP configured by the network device can meet a service specification of the terminal, and the terminal can access, be handed over to, and camp on a cell based on the configured at least one BWP.

Step 203: The terminal device scans the SSB beams from a low frequency to a high frequency.

It should be noted that the terminal device may alternatively scan the SSB beams from the high frequency to the low frequency. This is not specifically limited in this application.

Step 204: The terminal device accesses an SSB beam with a strong signal in detected SSB beams.

According to the foregoing method, the at least one BWP can be configured for the area covered by the target traffic beam, to enhance an SSB signal in the area, so that the terminal can access a cell. In addition, because the data channel quality in the area covered by the target traffic beam is higher than the first threshold, it can be ensured that the terminal can process a service after the access.

The following describes an implementation method of the embodiment shown in FIG. 2.

In an implementation, the at least one target traffic beam includes a first target traffic beam, for the first target traffic beam, a base station performs data transmission with K terminals by using the first target traffic beam, a ratio of a quantity of terminals whose data channel quality is higher than the first threshold to K is greater than a first preset ratio, and a ratio of a quantity of terminals whose broadcast channel quality is lower than the second threshold to K is greater than a second preset ratio, where K is an integer greater than or equal to 1.

In an implementation, the data channel quality may be represented by an SRS measurement result, and the broadcast channel quality is represented by an SSB measurement result. The SRS measurement result may be, for example, an SRS reference signal received power (RSRP) obtained by the base station, or an SRS signal to interference plus noise ratio (SINR) obtained by the base station. The SSB measurement result may be, for example, an SSB RSRP reported by the terminal. The following describes the foregoing implementation in detail.

For example, a terminal 1 to a terminal 100 separately perform data transmission with the base station by using a traffic beam 1, a quantity of terminals whose data channel quality is higher than the first threshold is 50, and a quantity of terminals whose broadcast channel quality is lower than the second threshold is 80. A terminal 101 to a terminal 200 separately perform data transmission with the base station by using a traffic beam 2, a quantity of terminals whose data channel quality is higher than the first threshold is 50, and a quantity of terminals whose broadcast channel quality is lower than the second threshold is 10. It can be determined that the traffic beam 1 is the first target traffic beam, and the base station transmits a first SSB beam in at least one BWP, where the first SSB beam covers an area covered by the traffic beam 1.

In another implementation, the base station may determine the at least one target traffic beam by using obtained different pieces of reference information. The different pieces of reference information herein include reference information that is of different terminals and that is obtained by the base station at a same moment, or further include reference information that is of a same terminal and that is obtained by the base station at different moments, or may further include reference information that is of different terminals and that is obtained by the base station at different moments.

The reference information includes a beam identifier of a traffic beam, an SSB measurement result that is received by the terminal in an area covered by the traffic beam corresponding to the beam identifier, and an uplink reference signal (Sounding Reference Signal, SRS) measurement result that is received by the base station and that is reported by the terminal in the area covered by the traffic beam corresponding to the beam identifier.

In still another implementation, each piece of reference information may further include a first indication used to indicate whether the terminal has performed redirection from a 5G network to a 4G network in an area covered by a traffic beam corresponding to a beam identifier, or may further include a second indication used to indicate whether the terminal has performed handover from the 5G network to the 4G network in the area covered by the traffic beam corresponding to the beam identifier.

Herein, the SSB RSRP is measured and reported to the base station by the terminal. The SRS RSRP and information about whether the terminal has performed redirection from the 5G network to the 4G network or information about whether the terminal has performed handover from the 5G network to the 4G network are obtained by the base station. In the first indication, "0" may be used to indicate that redirection from the 5G network to the 4G network has been performed, and "1" may be used to indicate that redirection from the 5G network to the 4G network has not been performed (or "1" is used to indicate that redirection from the 5G network to the 4G network has been performed, and "0" is used to indicate that redirection from the 5G network to the 4G network has not been performed). In the second indication, "0" may be used to indicate that handover from the 5G network to the 4G network has been performed, and "1" may be used to indicate that handover from the 5G network to the 4G network has not been performed (or "1" is used to indicate that handover from the 5G network to the 4G network has been performed, and "0" is used to indicate that handover from the 5G network to the 4G network has not been performed).

Figure 3:
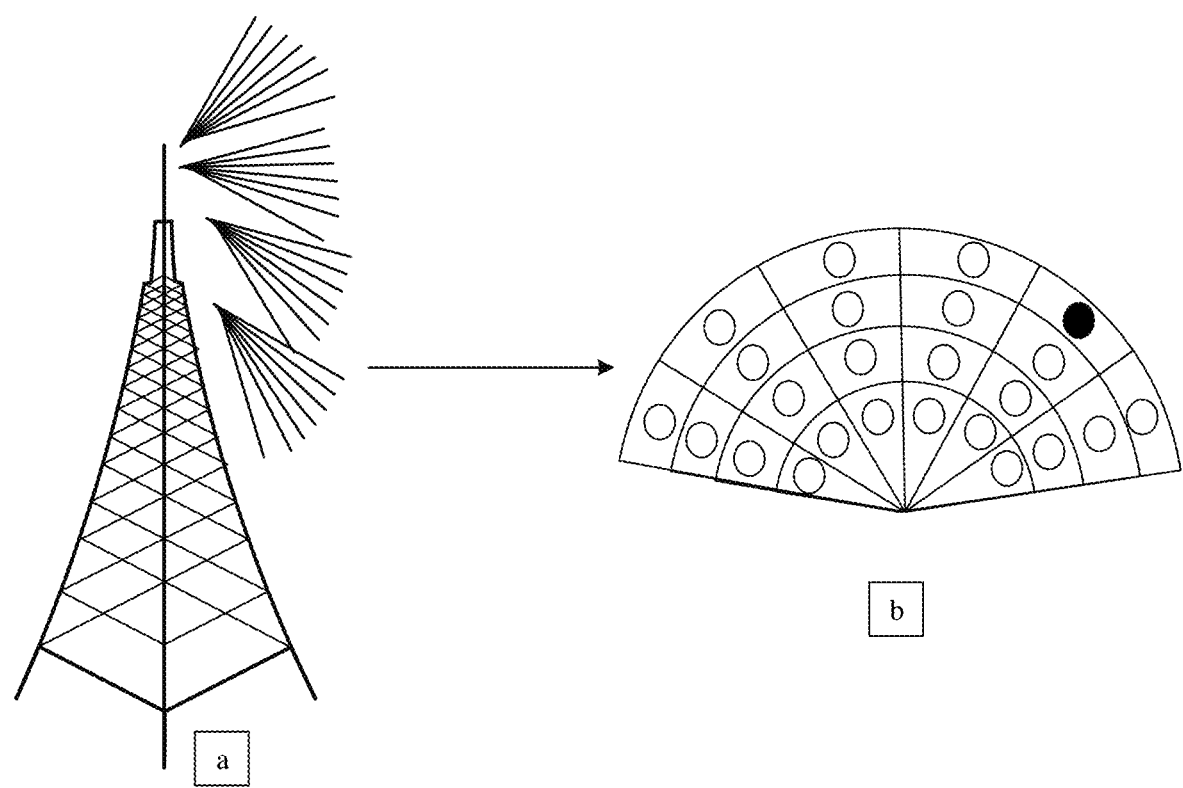
FIG. 3 is a schematic diagram of an application scenario of a radio broadcast beam coverage enhancement method according to an embodiment of this application.

To facilitate determining the target traffic beam, areas covered by traffic beams of a cell may be divided into virtual grids, where each traffic beam corresponds to one virtual grid. Without loss of generality, the following describes embodiments of this application in detail by using 32 traffic beams as an example. It may be understood that target traffic beams may be determined based on a same technical solution for traffic beams of all cells. As shown in FIG. 3, an envelope of traffic beams transmitted by a base station shown in FIG. 3(a) may be divided into virtual grids shown in FIG. 3(b), and each circle represents a virtual grid formed within beam coverage.

In an implementation, as shown in Table 1, the base station may maintain a table to record obtained different pieces of reference information.

TABLE 1

| | Beam identifier (0 to 31) | SRS RSRP (dBm) | SSB RSRP (dBm) | Blind redirection from 5G to 4G | Handover from 5G to 4G |
| --- | --- | --- | --- | --- | --- |
| UE 1-T1 moment | 3 | −111 | −105 | 0 | 1 |
| UE 2-T1 moment | 14 | −102 | −97 | 0 | 1 |
| ... | | | | | |
| UE 3-T2 moment | 6 | −109 | −102 | 1 | 0 |

The base station may reserve M records for each traffic beam. M is a positive integer, for example, 10 or 15. This is not specifically limited in this application.

The base station obtains the reference information based on the SSB RSRP reported by the terminal or based on the SSB SINR reported by the terminal, and records the obtained reference information in the table. The base station may collect statistics on the obtained reference information every specified periodicity, and select at least one target beam identifier from a plurality of beam identifiers included in the different pieces of reference information. For each beam identifier, the base station calculates a ratio of a quantity of SSB RSRPs lower than a second threshold to a quantity of SSB RSRPs corresponding to the beam identifier, and calculates a ratio of a quantity of SRS RSRPs higher than the first threshold to a quantity of SRS RSRPs corresponding to the beam identifier.

In an implementation, the base station obtains, through calculation based on the reference information in Table 1, ratios shown in Table 2. It should be noted that, for each beam identifier, when knowing that a quantity of pieces of reference information corresponding to the beam identifier is less than a specified quantity, the base station may determine that the reference information is invalid. In this case, the base station does not need to calculate a quantity of SSB measurement results lower than the second threshold and a quantity of SRS measurement results higher than the first threshold that are in the beam identifier.

TABLE 2

| Beam identifier | Quantity of records | Proportion of SSB RSRPs lower than the second threshold | Proportion of SRS RSRPs higher than the first threshold | Blind redirection from 5G to 4G and handover from 5G to 4G |
|---|---|---|---|---|
| 1 | 1000 | 5% | 7% | 10% |
| 2 | 2000 | 20% | 50% | 30% |
| 3 | 40 (The quantity is small, and is invalid) | The quantity of records does not meet a specification, and the ratio is not calculated. | The quantity of records does not meet a specification, and the ratio is not calculated. | The quantity of records does not meet a specification, and the ratio is not calculated. |
| ... | ... | ... | ... | ... |

The base station selects the target beam identifier from a plurality of beam identifiers in the reference information. In a plurality of SSB measurement results corresponding to the target beam identifier, a ratio of a quantity of SSB measurement results less than the second threshold to a quantity of pieces of reference information corresponding to the target beam identifier reaches a first preset ratio; and in a plurality of SRS measurement results corresponding to the target beam identifier, a ratio of a quantity of SRS measurement results higher than the first threshold to a quantity of pieces of reference information corresponding to the target beam identifier reaches a second preset ratio.

The first preset ratio and the second preset ratio may be customized. For example, the first preset ratio may be set to 10%, and the second preset ratio may be set to 40%. This is not specifically limited in this application.

In an implementation, a ratio of a quantity of pieces of reference information that are in the reference information corresponding to the target beam identifier and on which redirection from a 5G network to a 4G network or handover from the 5G network to the 4G network is performed to a quantity of pieces of reference information corresponding to the target beam identifier reaches a third preset ratio. The third preset ratio may be customized, for example, set to 20% or the like. This is not specifically limited in this application.

The base station selects a beam identifier 2 from the plurality of beam identifiers as a target service identifier based on Table 2. A traffic beam corresponding to the target service identifier may correspond to a black solid circle shown in FIG. 3(b). The base station may configure at least one BWP in an area covered by the target service identifier. The base station transmits N first SSB beams in the at least one BWP.

According to the foregoing method, the at least one target traffic beam can be determined based on the SSB RSRP and the SRS RSRP, and a configured first SSB beam can be transmitted in an area covered by the target traffic beam, to enhance an SSB signal in the area.

Without loss of generality, the following describes embodiments of this application in detail by using an example in which the base station configures one BWP for at least one target service identifier. The base station may configure a plurality of BWPs for the at least one target service identifier based on a same technical solution. This is not specifically limited in this application.

In an implementation, for a target area covered by one target traffic beam, a frequency occupied during SSB transmission by a first SSB beam that is in the N first SSB beams and that covers the target area does not completely overlap a frequency occupied during SSB transmission by a second SSB beam, and occupied time domain resources are the same, where the second SSB beam is a second SSB beam included in the SSB measurement result. It may be noted that the SSB measurement result may include includes one or more measurement results of the second SSB beam.

Figure 4A:
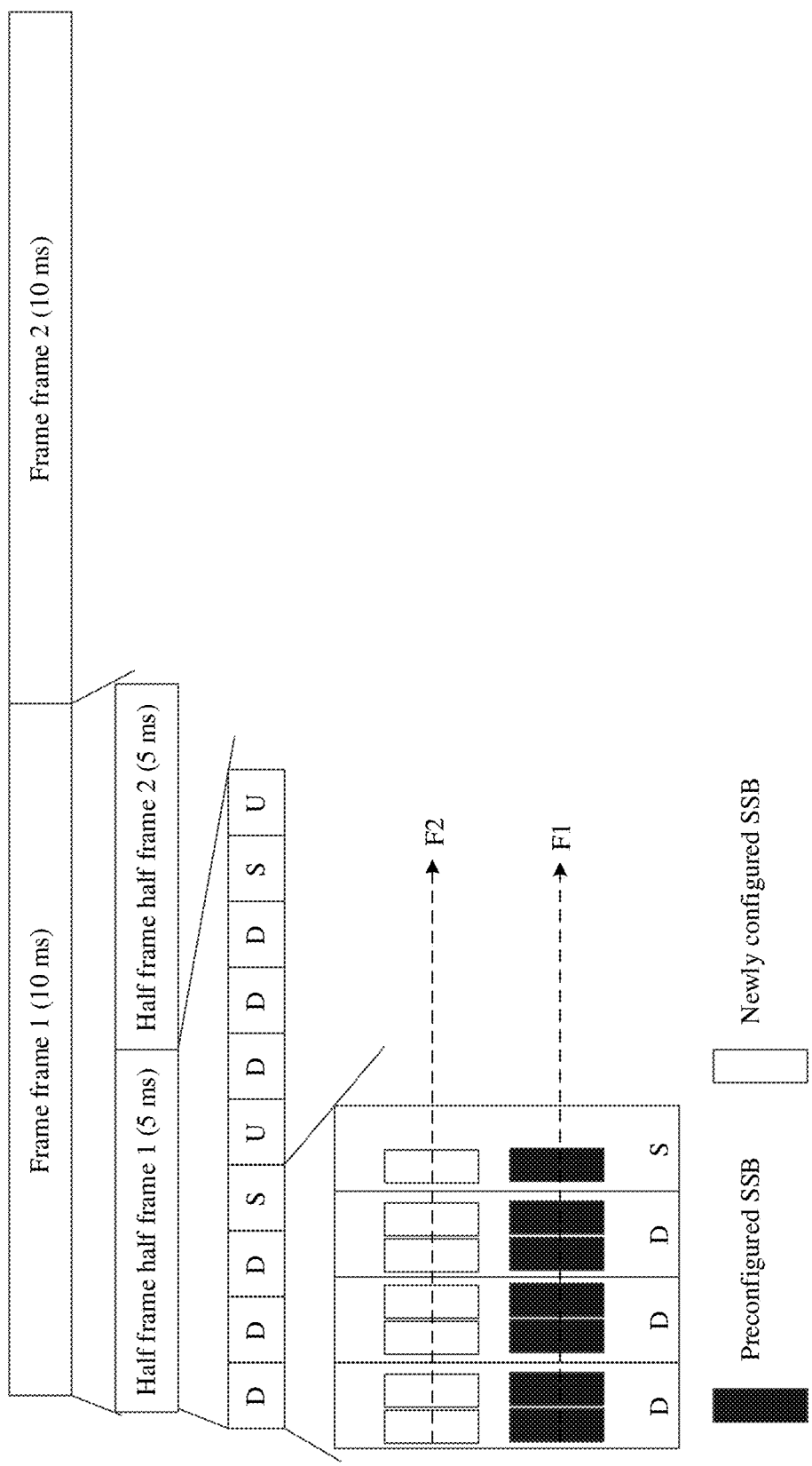
FIG. 4A is a schematic diagram of an application scenario of a radio broadcast beam coverage enhancement method according to an embodiment of this application.

The following describes the foregoing implementation method in detail with reference to the accompanying drawings. As shown in FIG. 4A, time domain of a first SSB beam in a downlink BWP newly configured by the base station may be the same as time domain of a second SSB beam in a preconfigured downlink BWP. Frequency domain of the first SSB beam configured by the base station is F2, frequency domain of the preconfigured second SSB beam is F1, and frequency domain of F2 is higher than that of F1. There are two frames in one SSB periodicity: a frame 1 and a frame 2, and each frame is further divided into two half frames: a half frame 1 and a half frame 2. Each half frame is further divided into a plurality of subframes: three downlink subframes (D), one special frame (S), and one uplink frame (U). The base station may transmit the preconfigured second SSB beam and the newly configured first SSB beam by using a downlink frame (D) and a special frame (S) that are of the first half frame 1, so that the terminal accesses a cell by using the SSB beams.

In another implementation, for a target area covered by one target traffic beam, a frequency occupied during SSB transmission by a first SSB beam that is in the N first SSB beams and that covers the target area does not completely overlap a frequency occupied during SSB transmission by a second SSB beam, and occupied time domain resources are different, where the second SSB beam is a preconfigured beam used to transmit an SSB signal to the target area.

Figure 4B:
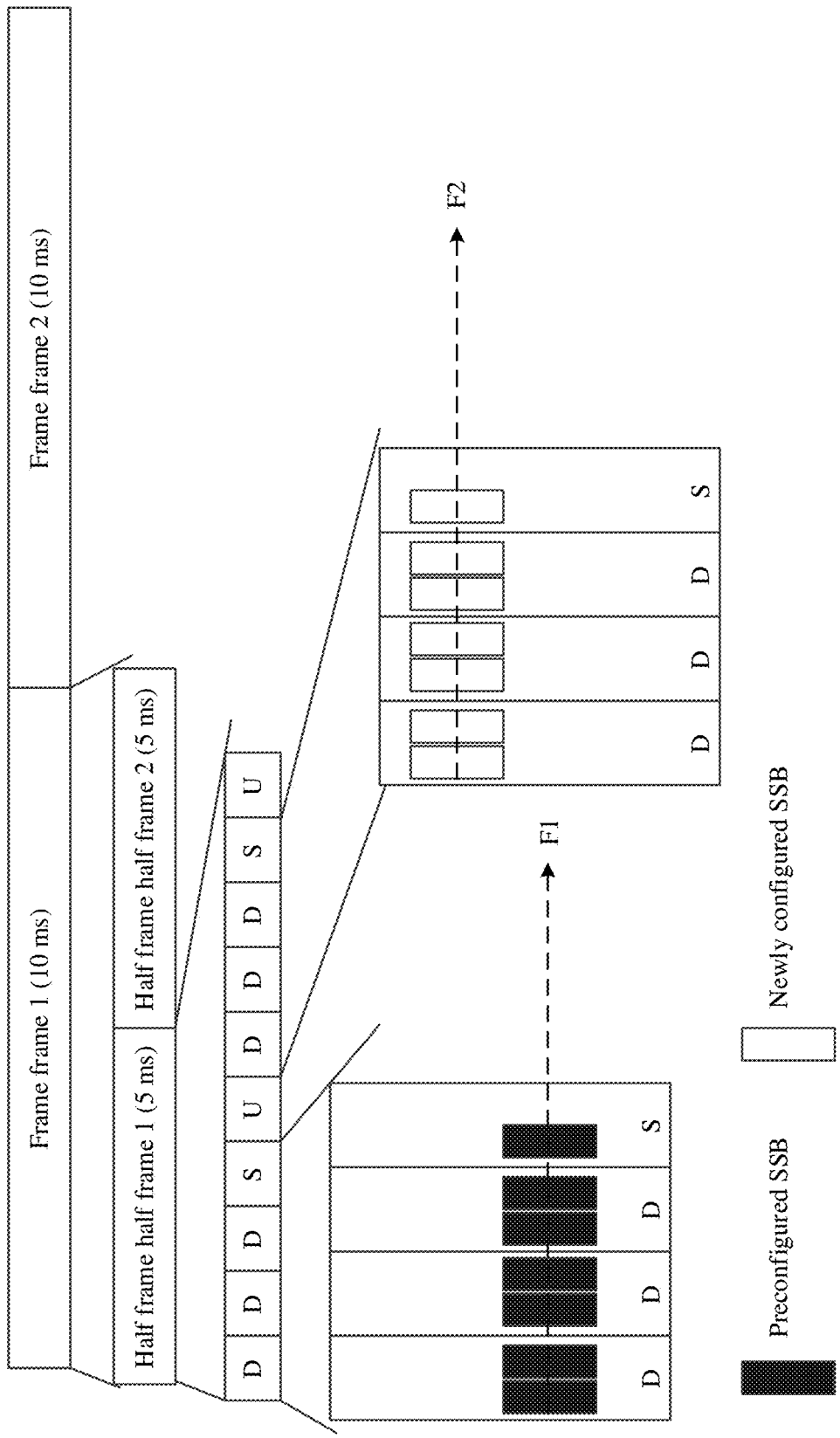
FIG. 4B is a schematic diagram of an application scenario of a radio broadcast beam coverage enhancement method according to an embodiment of this application.

The following describes the foregoing implementation method in detail with reference to the accompanying drawings. As shown in FIG. 4B, time domain of a first SSB beam in a downlink BWP newly configured by the base station may be different from time domain of a second SSB beam in a preconfigured downlink BWP. A center frequency of the first SSB beam configured by the base station is F2, a center frequency of the preconfigured second SSB beam is F1, and a value of F2 is higher than a value of F1. There are two frames in one SSB periodicity: a frame 1 and a frame 2, and each frame is further divided into two half frames: a half frame 1 and a half frame 2. Each half frame is further divided into a plurality of subframes: three downlink subframes (D), one special frame (S), and one uplink frame (U). The base station may transmit the preconfigured second SSB beam by using a downlink frame (D) and a special frame (S) that are of the first half frame 1, and transmit the newly configured first SSB beam by using a downlink frame (D) and a special frame (S) that are of the second half frame 2.

Figure 5A:
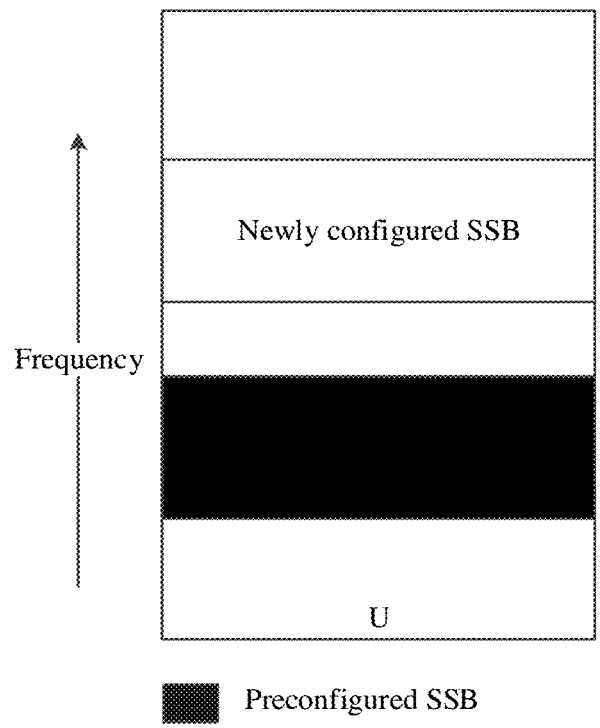
FIG. 5A is a schematic diagram of an application scenario of a radio broadcast beam coverage enhancement method according to an embodiment of this application.

In an implementation, the base station may further configure an uplink BWP. As shown in FIG. 5A, a frequency of a first SSB beam in a BWP newly configured by the base station and frequency domain of a preconfigured second SSB beam do not overlap, and time domain is the same.

Figure 5B:
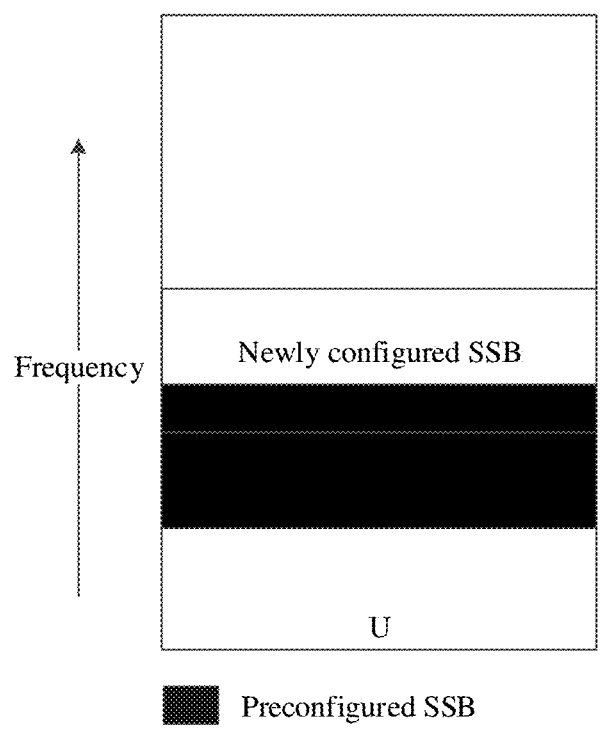
FIG. 5B is a schematic diagram of an application scenario of a radio broadcast beam coverage enhancement method according to an embodiment of this application.

In another implementation, as shown in FIG. 5B, a frequency of a first SSB beam in a BWP newly configured by the base station and frequency domain of a preconfigured second SSB beam overlap, and time domain is the same.

According to the foregoing method, in this embodiment of this application, the at least one BWP is configured in an area in which a service signal is relatively strong and an SSB signal is relatively weak, and the at least one BWP includes the N first SSB beams used to transmit the SSB signal, to enhance the SSB signal, so that the terminal accesses a cell by using the SSB signal.

Figure 6A:
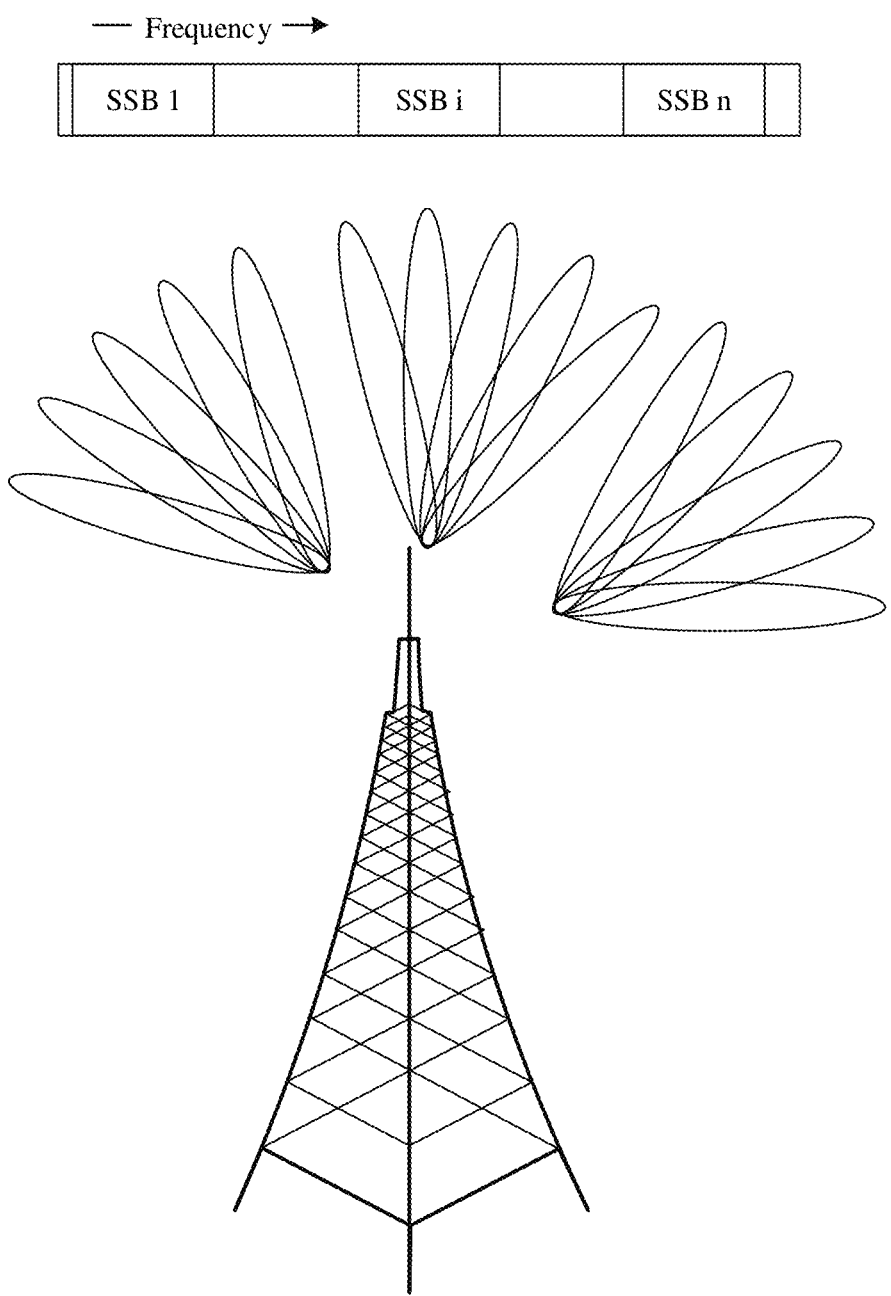
FIG. 6A is a schematic diagram of an application scenario of a radio broadcast beam coverage enhancement method according to an embodiment of this application.

In an implementation, first SSB beams of BWPs configured in this embodiment of this application are in different sets, to form coverage in different directions. As shown in FIG. 6A, first SSB beams of BWPs configured in this embodiment of this application can implement coverage in different horizontal directions, to expand a coverage envelope of an SSB signal.

Figure 6B:
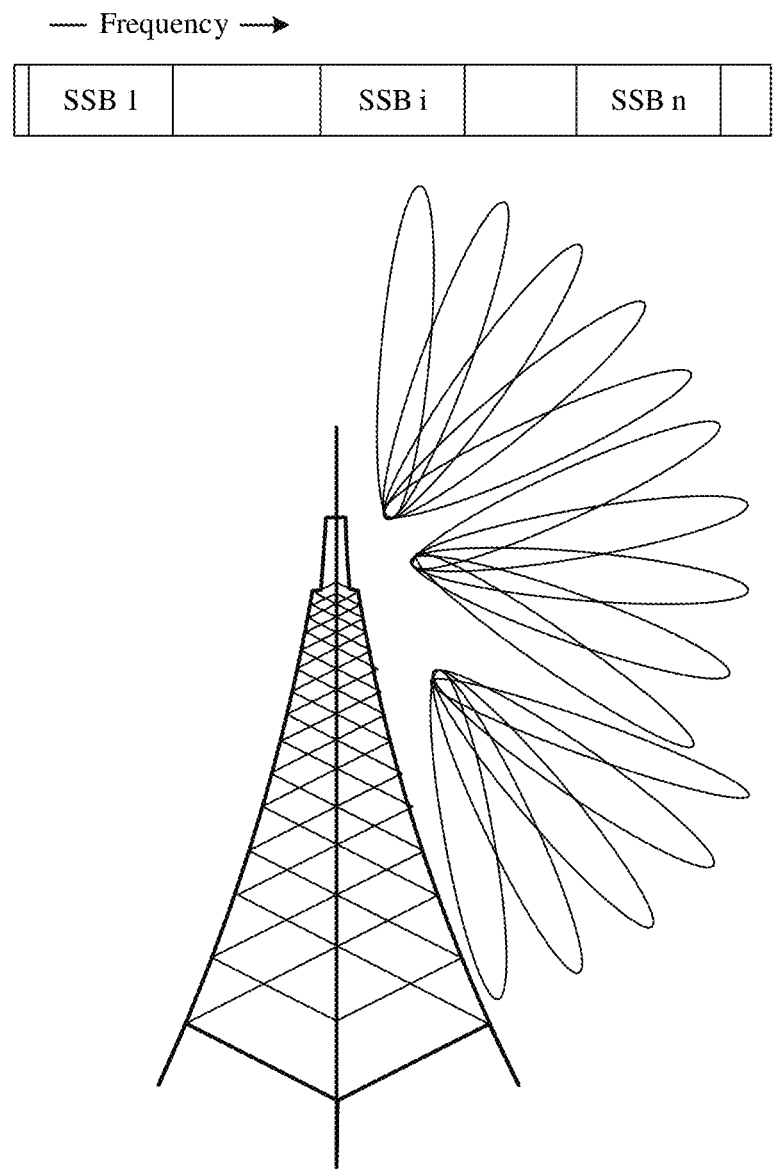
FIG. 6B is a schematic diagram of an application scenario of a radio broadcast beam coverage enhancement method according to an embodiment of this application.

As shown in FIG. 6B, first SSB beams of BWPs configured in this embodiment of this application can implement coverage in different vertical directions, to expand a coverage envelope of an SSB signal.

Figure 7A:
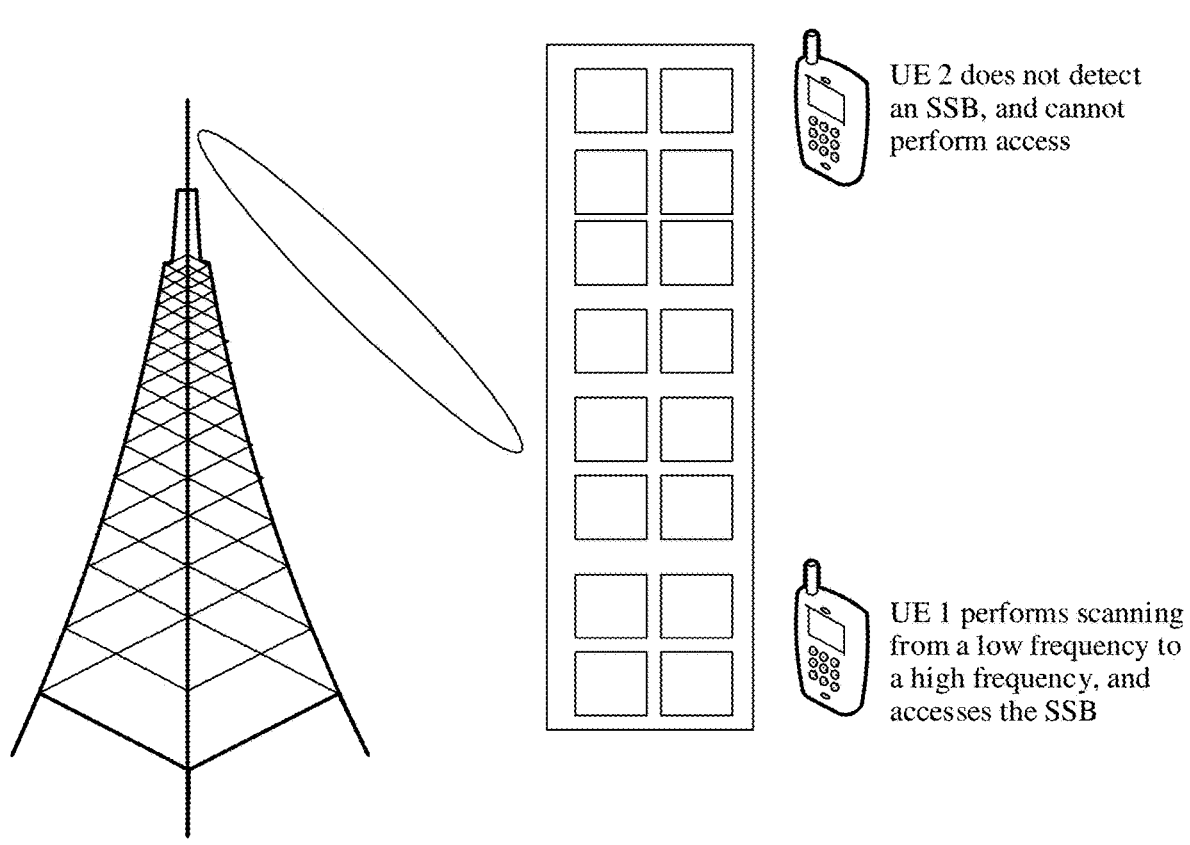
FIG. 7A is a schematic diagram of an application scenario of a radio broadcast beam coverage enhancement method according to an embodiment of this application.

The following describes the foregoing implementation methods in detail with reference to the accompanying drawings and the specific embodiments. As shown in FIG. 7A, there is only one BWP in a current technology, and a maximum quantity of SSB beams in each BWP is 7 or 8 according to a specification in a protocol. In a high-rise scenario, UE 1 is located on a low floor, for example, the 1st floor to the 15th floor, and UE 2 is located on a high floor, for example, the 16th floor to the 30th floor. Due to coverage of the SSB beam, the UE 1 can perform scanning from a low frequency to a high frequency, detect an SSB, and access the SSB. The UE 2 performs scanning from the low frequency to the high frequency, and cannot detect the SSB. Consequently, the UE 2 cannot access the SSB.

Figure 7B:
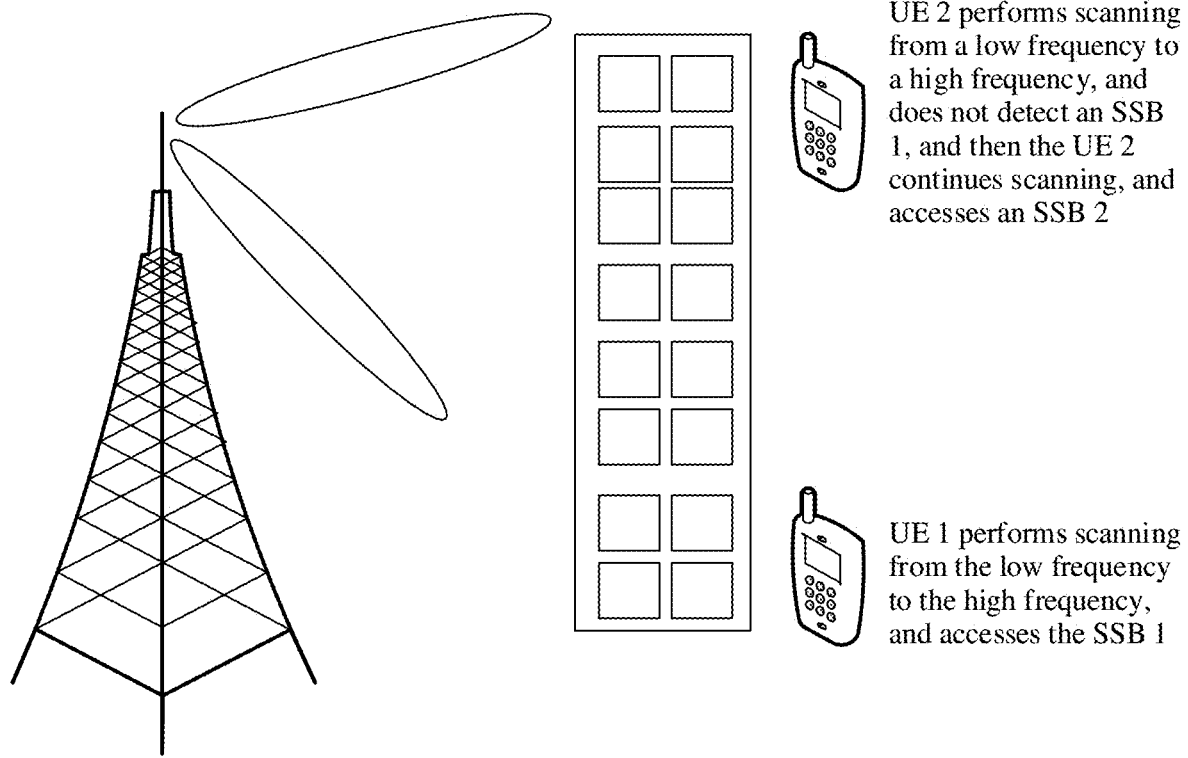
FIG. 7B is a schematic diagram of an application scenario of a radio broadcast beam coverage enhancement method according to an embodiment of this application.

As shown in FIG. 7B, according to the technical solution of this application, a new BWP may be configured for an area, for example, the 16th floor to the 30th floor, with a poor SSB signal. The newly configured BWP may include N first SSB beams, for example, 7 or 8 first SSB beams. Directions of beams included in the newly configured BWP cover a range of the 16th floor to the 30th floor, and an SSB signal is transmitted by using some beams in the newly configured BWP. For example, an SSB signal transmitted in a beam pointing to the 1st floor to the 15th floor may be defined as an SSB 1, and an SSB signal transmitted in a newly added beam pointing to the 16th floor to the 30th floor may be defined as an SSB 2. The UE 1 performs scanning from the low frequency to the high frequency, so that the UE 1 can detect the preconfigured SSB 1, and access the SSB 1. The UE 2 performs scanning from the low frequency band to the high frequency band, so that the UE 2 can detect the newly configured SSB 2, and access the SSB 2.

It should be noted that this application is applicable to a scenario in which service signal coverage is not limited but SSB signal coverage is limited, for example, a high-rise scenario, a dense low buildings scenario, or an urban village scenario.

Figure 8:
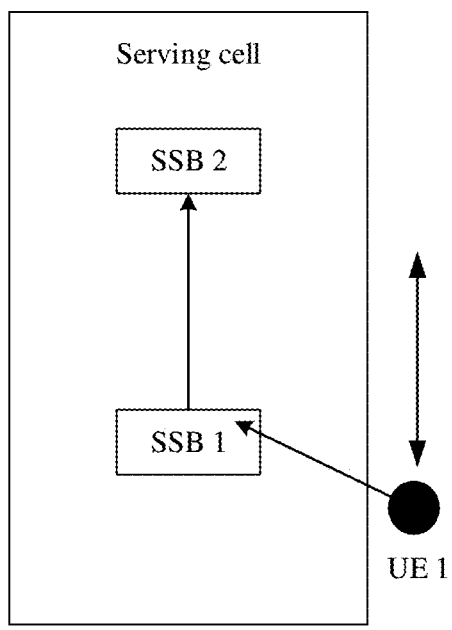
FIG. 8 is a schematic diagram of an application scenario of a radio broadcast beam coverage enhancement method according to an embodiment of this application.

In an implementation, after the base station configures the at least one BWP, the terminal may perform handover between different BWPs in a same cell. As shown in FIG. 8, an SSB 1 and an SSB 2 are configured in a serving cell A, and UE 1 scans SSB signals from a low frequency to a high frequency. The UE 1 selects an SSB signal with high signal strength from the detected SSB signals to access the SSB signal. For example, when signal strength of the SSB 1 is higher than signal strength of the SSB 2, the UE 1 accesses the SSB 1. When an RSRP of the SSB 1 is lower than a second threshold, the UE 1 performs SSB measurement. When measuring that an RSRP of the SSB 2 is higher than a set threshold, where for example, the set threshold may be −80 dBm, the UE 1 is handed over to the SSB 2.

Figure 9:
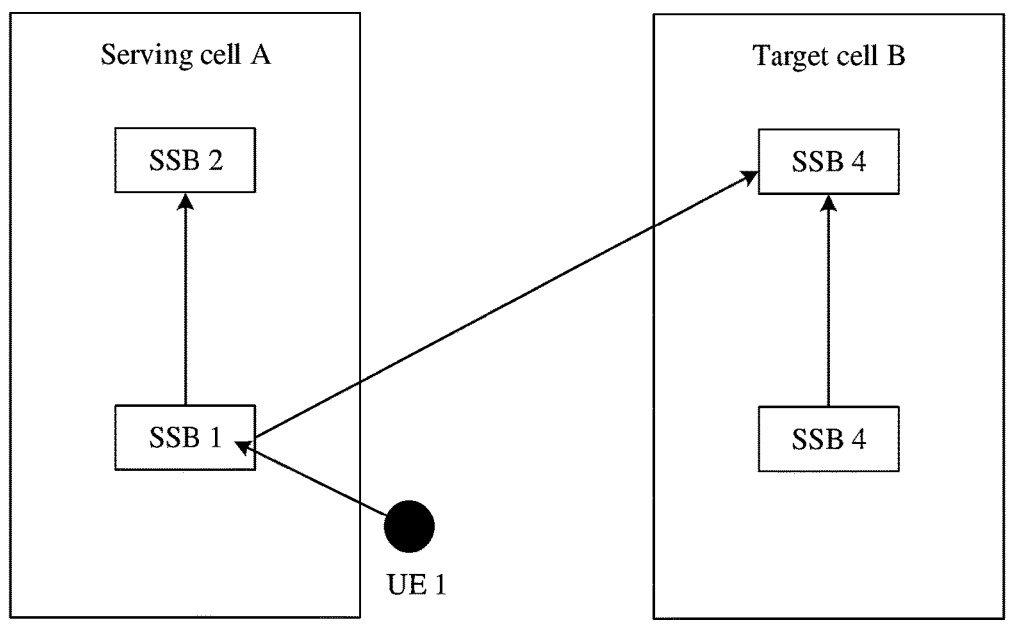
FIG. 9 is a schematic diagram of an application scenario of a radio broadcast beam coverage enhancement method according to an embodiment of this application.

In another implementation, the terminal may perform handover between different BWPs in different cells. As shown in FIG. 9, an SSB 1 and an SSB 2 are configured in a serving cell A, and an SSB 3 and an SSB 4 are configured in a target cell B. When the UE 1 accesses the serving cell A by using the SSB 1, and an RSRP of the SSB 1 is lower than a second threshold, the UE 1 performs SSB measurement. When measuring that an RSRP of the SSB 2 is lower than a set threshold, the UE 1 cannot be handed over to the SSB 2. In this case, the UE 1 measures SSB signals of the target cell B, selects an SSB of a higher RSRP from an RSRP of the SSB 3 and an RSRP of the SSB 4 that are obtained through measurement, and accesses the SSB. When the UE 1 is handed over to the target cell B, the serving cell A needs to notify the target cell B of a specific SSB to which the UE 1 needs to be handed over. For example, when the UE 1 measures that the RSRP of the SSB 3 is higher than the RSRP of the SSB 4, the UE 1 needs to be handed over to the SSB 3. In this case, the serving cell A needs to notify the target cell B that the UE 1 needs to be handed over to the SSB 3, so that the target cell B prepares an uplink physical random access channel PRACH resource and a common physical downlink control channel Common PDCCH resource for the UE 1.

In an implementation, the N first SSB beams in the at least one BWP configured by the base station are further used to transmit a common physical downlink control channel Common PDCCH, and the second SSB beam in the preconfigured BWP is further used to transmit a Common PDCCH.

Herein, an offset between a start position of a resource block for transmitting the Common PDCCH and a start position of a resource block for transmitting the SSB on the first SSB beam is the same as or different from an offset between a start position of a resource block for transmitting the Common PDCCH and a start position of a resource block for transmitting the SSB on the second beam.

Figure 10:
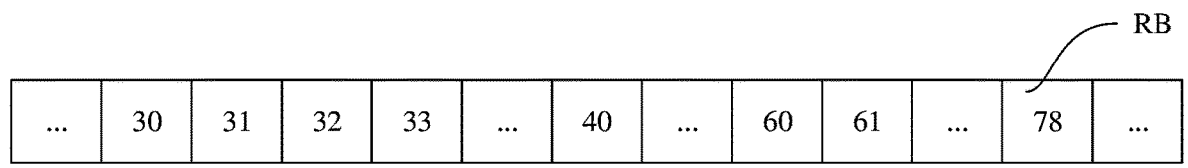
FIG. 10 is a schematic diagram of an application scenario of a radio broadcast beam coverage enhancement method according to an embodiment of this application.

The following describes the foregoing implementation methods in detail with reference to the accompanying drawings and the specific embodiments. As shown in FIG. 10, a Common PDCCH occupies the 30th to the 78th resource blocks (RBs) in a downlink BWP to which the second SSB beam belongs, and an SSB signal occupies the 40th to the 60th RBs. Therefore, an offset that is between a start position of the RBs for transmitting the Common PDCCH and a start position of the RBs for transmitting the SSB and that is in the downlink BWP to which the second SSB beam belongs is 10 RBs. RBs that are for transmitting a Common PDCCH and that are in a downlink BWP to which the first SSB beam belongs may be the 55th to the 103rd RBs, and RBs that are for transmitting an SSB and that are in the downlink BWP to which the first SSB beam belongs may be the 65th to the 85th RBs. Alternatively, RBs that are for transmitting a Common PDCCH and that are in a downlink BWP to which the first SSB beam belongs may be the 55th to the 103rd RBs, and RBs for transmitting an SSB are the 75th to the 95th RBs.

In another implementation, a time resource that is in the downlink BWP to which the first SSB beam belongs and that is for transmitting the Common PDCCH is the same as or different from a time resource that is in the downlink BWP to which the second SSB beam belongs and that is for transmitting the Common PDCCH.

The following describes the foregoing implementation methods in detail with reference to the specific embodiments. A time resource for transmitting the Common PDCCH on the second SSB beam may be represented by symbol numbers, for example, may be 0, 1, and 2. In other words, the symbol numbers of the PDCCH on the second SSB beam are 0, 1, and 2. In the BWP configured by the base station, symbol numbers of the Common PDCCH on the first SSB beam may be 0, 1, and 2, or symbol numbers of the Common PDCCH on the first SSB beam may be 0, or 1, or 2, or 0 and 1, or 1 and 2.

The radio broadcast beam coverage enhancement method provided in embodiments of this application is described above in detail with reference to FIG. 2 and FIG. 10. The following describes in detail the radio broadcast beam coverage enhancement apparatus provided in embodiments of this application with reference to FIG. 11 to the FIG. 13.

Figure 11:
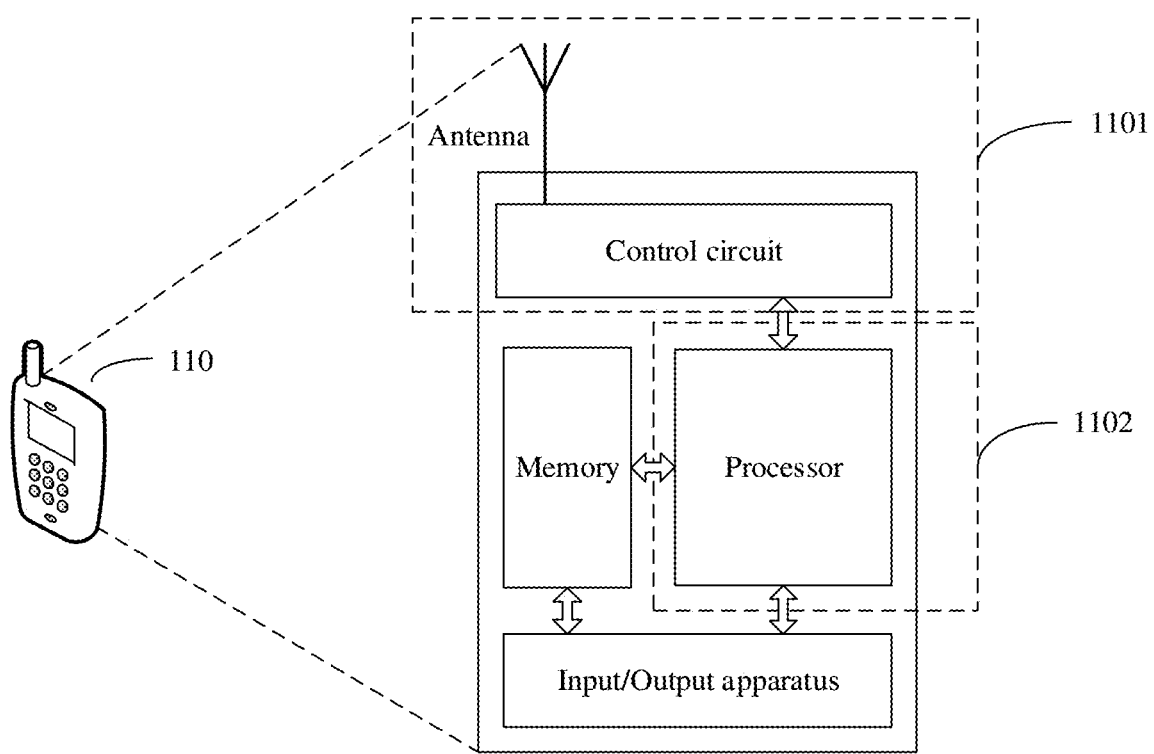
FIG. 11 is a schematic diagram of a structure of a terminal device according to an embodiment of this application.

FIG. 11 is a schematic diagram of a structure of a terminal device 110 according to an embodiment of this application. The terminal device is used in the system shown in FIG. 1, and performs functions of the terminal device in the foregoing method embodiments. For ease of description, FIG. 11 shows only main components of the terminal device. As shown in FIG. 11, the terminal device 110 includes a processor, a memory, a control circuit, an antenna, and an input/output apparatus. The processor is mainly configured to process a communication protocol and communication data, control the entire terminal device, execute a software program, and process data of the software program, for example, configured to support the terminal device in performing the actions described in the foregoing method embodiments, for example, reporting an SSB RSRP or an SSB SINR to a base station. The memory is mainly configured to store a software program and data, for example, store the SSB RSRP or the SSB SINR described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus, for example, a touchscreen, a display, or a keyboard, is mainly configured to: receive data input by a user and output data to the user.

After the terminal device is powered on, the processor may read a software program in a storage unit, explain and execute instructions of the software program, and process the data of the software program. When data needs to be sent in a wireless manner, after the processor performs baseband processing on the to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 11. A person skilled in the art may understand that the baseband processor and the central processing unit each may be an independent processor, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In this embodiment of this application, the antenna and the control circuit that have a transceiver function may be considered as a transceiver unit 1101 of the terminal device 110, for example, to support the terminal device in performing a receiving function and a sending function described in FIG. 2. The processor having a processing function is considered as a processing unit 1102 of the terminal device 110. As shown in FIG. 11, the terminal device 110 includes the transceiver unit 1101 and the processing unit 1102. The transceiver unit may also be referred to as a transceiver, a transceiver machine, a transceiver apparatus, or the like. Optionally, a component configured to implement a receiving function in the transceiver unit 1101 may be considered as a receiving unit. A component configured to implement a sending function in the transceiver unit 1101 may be considered as a sending unit. In other words, the transceiver unit 1101 includes the receiving unit and the sending unit. The receiving unit may also be referred to as a receiver, an input port, a receiving circuit, or the like. The sending unit may be referred to as a transmitter, a transmitter, a transmitting circuit, or the like.

The processor 1102 may be configured to execute instructions stored in the memory, to control the transceiver unit 1101 to receive a signal and/or send a signal, to complete a function of the terminal device in the foregoing method embodiments. In an implementation, a function of the transceiver unit 401 may be implemented by using a transceiver circuit or a transceiver-dedicated chip.

Figure 12:
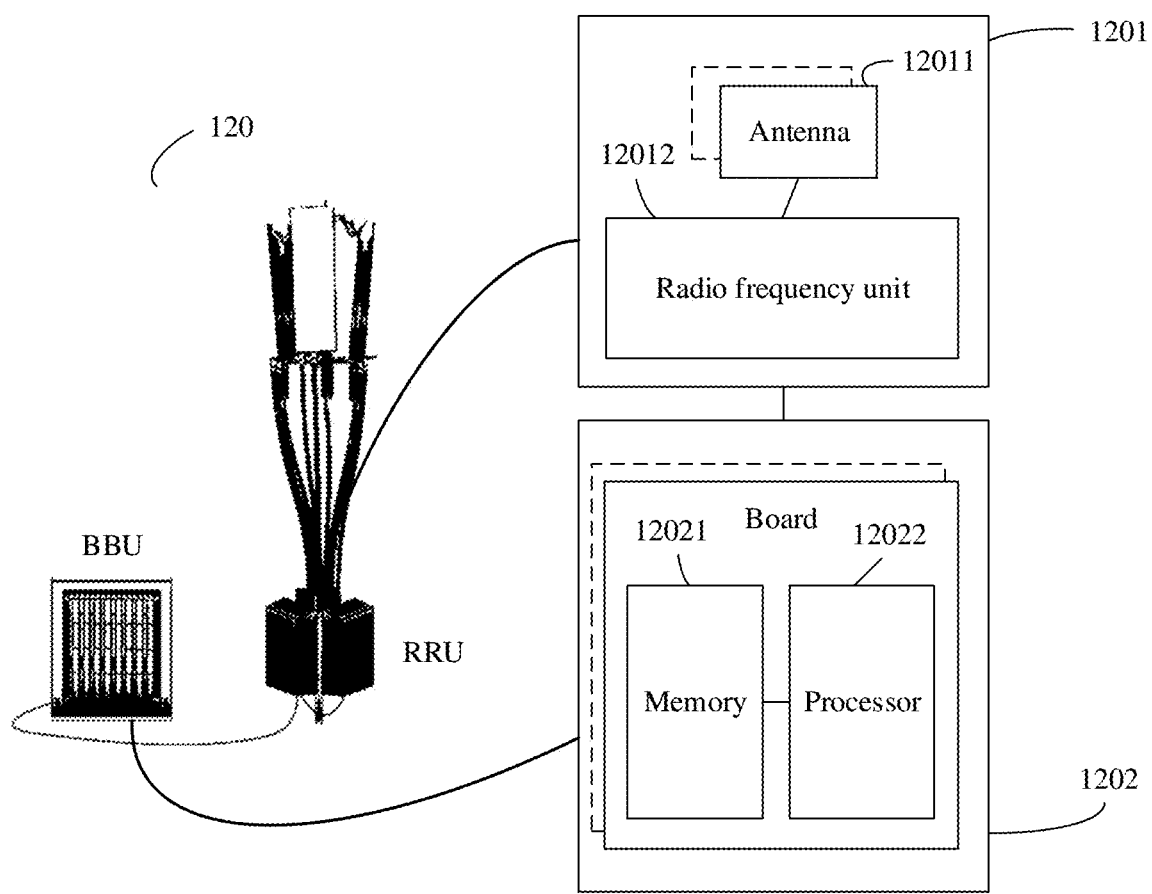
FIG. 12 is a schematic diagram of a structure of a network device according to an embodiment of this application.

FIG. 12 is a schematic diagram of a structure of a network device according to an embodiment of this application, for example, may be a schematic diagram of a structure of a base station. As shown in FIG. 12, the base station may be used in a system shown in FIG. 1, and perform functions of the base station in the foregoing method embodiments. The base station 12 may include one or more radio frequency units, such as a remote radio unit (RRU) 1201 and one or more baseband units (BBU) (which may also be referred to as digital units (DUs)) 1202. The RRU 1201 may be referred to as a transceiver unit, a transceiver, a transceiver circuit, a transceiver, or the like, and may include at least one antenna 12011 and a radio frequency unit 12012. The part 12012 of the RRU is mainly configured to: send and receive a radio frequency signal, and perform conversion between a radio frequency signal and a baseband signal, for example, configured to send the SSB beam in the foregoing embodiments to a terminal. The BBU 1202 is mainly configured to: perform baseband processing, control a base station, and the like. The RRU 1201 and the BBU 1202 may be physically disposed together, or may be physically disposed separately, to be specific, the base station is a distributed base station.

The BBU 1202 is a control center of the base station, may also be referred to as a processing unit, and is mainly configured to complete baseband processing functions such as channel encoding, multiplexing, modulation, and spectrum spreading. For example, the BBU (the processing unit) 1202 may be configured to control the base station to execute an operation procedure of the base station in the foregoing method embodiments.

In an example, the BBU 1202 may include one or more boards, and a plurality of boards may jointly support a radio access network (for example, an LTE network) of a single access standard, or may separately support radio access networks (for example, an LTE network, a 5G network, or another network) of different access standards. The BBU 1202 further includes a memory 12021 and a processor 12022. The memory 12021 is configured to store necessary instructions and data. The processor 12022 is configured to control the base station to perform a necessary action, for example, configured to control the base station to perform an operation procedure related to the base station in the foregoing method embodiments. The memory 12021 and the processor 12022 may serve one or more boards. In other words, a memory and a processor may be independently disposed on each board. Alternatively, a plurality of boards may share a same memory and a same processor. In addition, a necessary circuit may further be disposed on each board.

Figure 13:
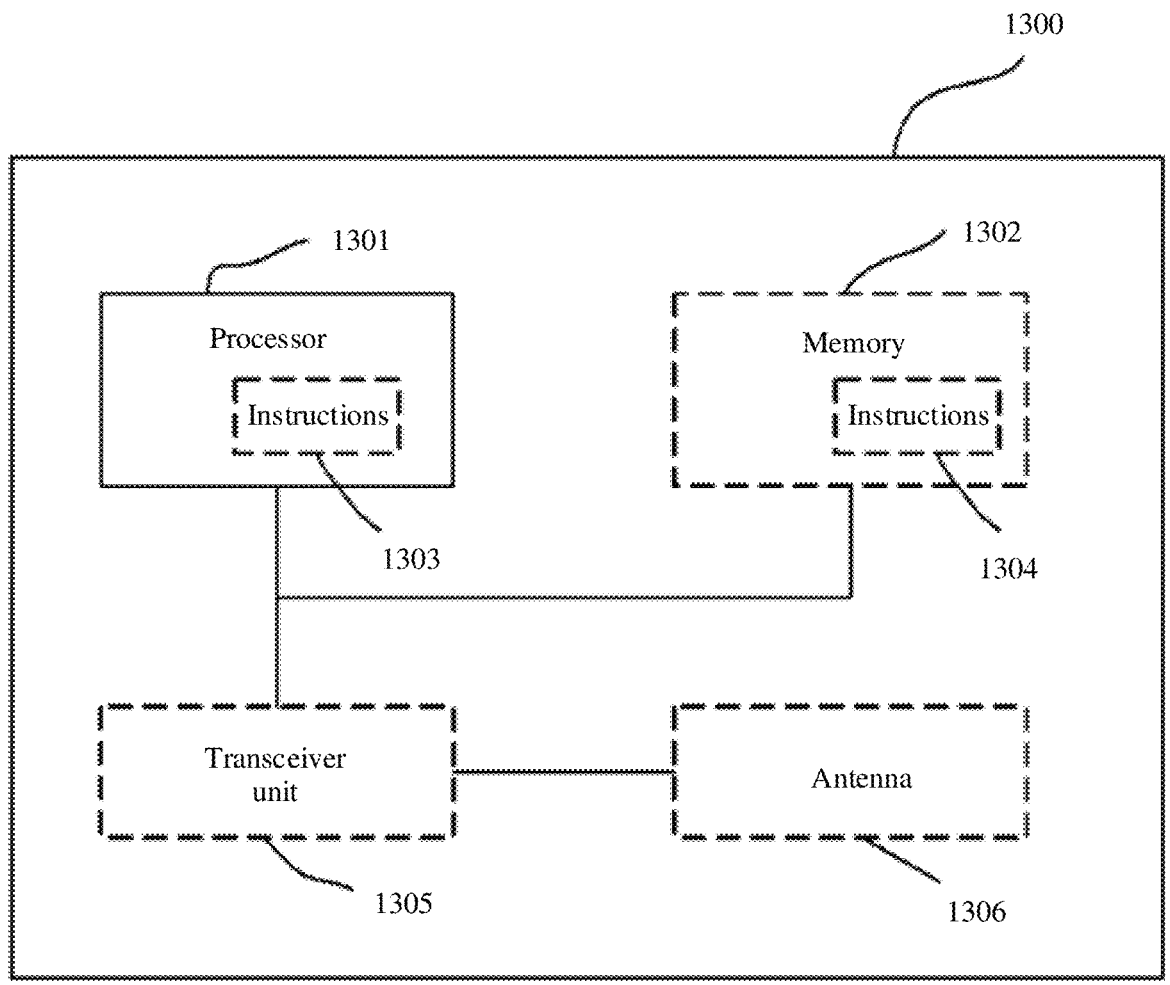
FIG. 13 is a schematic diagram of a structure of a communication apparatus according to an embodiment of this application.

FIG. 13 is a schematic diagram of a structure of a radio broadcast beam coverage enhancement apparatus 1300. The apparatus 1300 may be configured to implement the method described in the foregoing method embodiments. Refer to the description in the foregoing method embodiments. The communication apparatus 1300 may be a chip, a network device (such as a base station), a terminal device, another network device, or the like.

The communication apparatus 1300 includes one or more processors 1301. The processor 1301 may be a general-purpose processor, a dedicated processor, or the like. For example, the processor 1301 may be a baseband processor or a central processing unit. The baseband processor may be configured to process a communication protocol and communication data. The central processing unit may be configured to control the communication apparatus (for example, a base station, a terminal, or a chip), execute a software program, and process data of the software program. The communication apparatus may include a transceiver unit that is configured to input (receive) and output (send) a signal. For example, the communication apparatus may be a chip, and the transceiver unit may be an input and/or output circuit or a communication interface of the chip. The chip may be used for a terminal, a base station, or another network device. For another example, the communication apparatus may be a terminal, a base station, or another network device, and the transceiver unit may be a transceiver, a radio frequency chip, or the like.

The communication apparatus 1300 includes the one or more processors 1301, and the one or more processors 1301 may implement the method performed by the base station or the terminal in the embodiment shown in FIG. 2.

In a possible design, the communication apparatus 1300 includes a means configured to determine at least one target traffic beam. A function of the means for determining the at least one target traffic beam may be implemented by using one or more processors. For example, the at least one target traffic beam may be determined by using the one or more processors, and an SSB signal may be sent by using a transceiver, an input/output circuit, or an interface of a chip. Refer to related descriptions in the foregoing method embodiments.

In a possible design, the communication apparatus 1300 includes a means configured to configure at least one BWP or receive an SSB signal. For the SSB signal and how to receive the SSB signal, refer to related descriptions in the foregoing method embodiments. For example, the SSB signal may be received by using a transceiver, an input/output circuit, or an interface of a chip, or the SSB signal may be received by using the one or more processors. For configuring the at least one BWP and how to configure the at least one BWP, refer to related descriptions in the foregoing method embodiments. For example, the at least one BWP may be configured by using a transceiver, an input/output circuit, or an interface of a chip, or the at least one BWP may be configured by using the one or more processors.

Optionally, the processor 1301 may further implement another function in addition to the method in the embodiment shown in FIG. 2.

Optionally, in a design, the processor 1301 may execute instructions, so that the communication apparatus 1300 performs the method described in the foregoing method embodiments. All or some of the instructions, for example, instructions 1303, may be stored in the processor. Alternatively, all or some of the instructions, for example, instructions 1304, may be stored in the memory 1302 coupled to the processor. Alternatively, the instructions 1303 and 1304 may be used together to enable the communication apparatus 1300 to perform the method described in the foregoing method embodiments.

In another possible design, the communication apparatus 1300 may further include a circuit, and the circuit may implement a function of the base station or the terminal in the foregoing method embodiments.

In still another possible design, the communication apparatus 1300 may include one or more memories 202. The memory stores instructions 1304, and the instructions may be executed on the processor, so that the communication apparatus 1300 performs the method described in the foregoing method embodiments. Optionally, the memory may further store data. Optionally, the processor may also store instructions and/or data. For example, the one or more memories 1302 may store a synchronization protocol header described in the foregoing embodiments, PDCP indication information in the foregoing embodiments, or the like. The processor and the memory may be separately disposed, or may be integrated together.

In yet another possible design, the communication apparatus 1300 may further include a transceiver unit 1305 and an antenna 1306. The processor 1301 may be referred to as a processing unit, and controls the communication apparatus (the terminal or the base station). The transceiver unit 1305 may be referred to as a transceiver, a transceiver circuit, a transceiver, or the like, and is configured to implement a transceiver function of the communication apparatus by using the antenna 1306.

This application further provides a communication system, including the foregoing one or more network devices and one or more terminal devices.

It should be noted that, the processor in embodiments of this application may be an integrated circuit chip, and has a signal processing capability. In an implementation process, the steps in the foregoing method embodiments may be completed by using a hardware integrated logic circuit in the processor or instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (DR RAM). It should be noted that the memory in the system and the method described in this specification is intended to include, but not limited to, these memories and any memory of another proper type.

An embodiment of this application further provides a computer-readable medium. The computer-readable medium stores a computer program. When the computer program is executed by a computer, the radio broadcast beam coverage enhancement method in any one of the foregoing method embodiments is implemented.

An embodiment of this application further provides a computer program product. When the computer program product is executed by a computer, the radio broadcast beam coverage enhancement method in any one of the foregoing method embodiments is implemented.

All or some of the foregoing embodiments may be implemented by using software, hardware, firmware, or any combination thereof. When the software is used for implementation, all or some of embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (Digital Video Disc, DVD)), a semiconductor medium (for example, a solid-state drive (SSD)), or the like.

An embodiment of this application further provides a processing apparatus, including a processor and an interface. The processor is configured to perform the radio broadcast beam coverage enhancement method in any one of the foregoing method embodiments.

It should be understood that the processing apparatus may be a chip. The processor may be implemented by hardware, or may be implemented by software. When the processor is implemented by hardware, the processor may be a logic circuit, an integrated circuit, or the like. When the processor is implemented by software, the processor may be a general purpose processor, implemented by reading software code stored in a memory. The memory may be integrated into the processor, or may be located outside the processor and exist independently.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing in the entire specification does not necessarily refer to a same embodiment. In addition, these particular features, structures, or characteristics may be combined in one or more embodiments in any appropriate manner. It should be understood that, in embodiments of this application, sequence numbers of the foregoing processes do not mean execution sequences. The execution sequences of the processes should be determined based on functions and internal logic of the processes, and should not constitute any limitation to implementation processes of embodiments of this application.

In addition, the terms "system" and "network" are usually used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of this application, "B corresponding to A" indicates that B is associated with A, and B may be determined based on A. However, it should be further understood that determining B based on A does not mean that B is determined based on only A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on a particular application and a design constraint of the technical solutions. A person skilled in the art may use different methods to implement the described functions for each particular application, but it should not be considered that the implementation goes beyond the scope of this application.

A person skilled in the art may clearly understand that, for convenient and brief description, for a detailed working process of the foregoing system, apparatus, and unit, refer to the corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in another form.

The units described as separate parts may or may not be physically separate, and parts displayed as units may or may not be physical units, in other words, may be located in one position, or may be distributed on a plurality of network units. Some or all of the units may be selected based on an actual specification to achieve the objectives of the solutions in embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When embodiments of this application are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and is accessible by a computer. In addition, any connection may be properly defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk and disc used in this application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A radio broadcast beam coverage enhancement method, comprising:
   determining, by a base station, at least one target traffic beam that covers an area where a data channel quality of at least one terminal is higher than a first threshold and a broadcast channel quality is lower than a second threshold; and
   transmitting, by the base station, N first synchronization resource block (SSB) beams in at least one bandwidth part (BWP), wherein the N first SSB beams cover the area covered by the at least one target traffic beam, and N is an integer greater than or equal to 1.

2. The method according to claim 1, wherein the at least one target traffic beam comprises a first target traffic beam and the at least one terminal comprises N terminals, for the first target traffic beam, the base station performs data transmission with the N terminals by using the first target traffic beam, a ratio of a quantity of the N terminals where the data channel quality is higher than the first threshold to K is greater than a first preset ratio, and a ratio of a quantity of the N terminals where the broadcast channel quality is lower than the first threshold to K is greater than a second preset ratio, wherein K is an integer greater than or equal to 1.

3. The method according to claim 2, wherein for the first target traffic beam, a ratio of a quantity of the N terminals that perform redirection and/or handover from a 5G network to a 4G network to K is greater than a third preset ratio.

4. The method according to claim 1, wherein the data channel quality is represented by an uplink reference signal (SRS) measurement result, and the broadcast channel quality is represented by an SSB measurement result.

5. The method according to claim 4, wherein the SRS measurement result comprises at least one of an SRS reference signal received power RSRP and an SRS signal to interference plus noise ratio (SINR), and wherein:
the SSB measurement result comprises an SSB RSRP.

6. The method according to claim 5, wherein the method comprises:
at least one second SSB beam and the N first SSB beams do not completely overlap on a frequency domain resource; and
the SSB measurement result comprises a measurement result of the at least one second SSB beam.

7. The method according to claim 6, wherein the first SSB beam is further used to transmit a common physical downlink control channel Common (PDCCH), and the second SSB beam is further used to transmit a Common PDCCH;
an offset that is in a BWP of the at least one BWP to which the first SSB beam belongs and that is between a start position of a resource block for transmitting the Common PDCCH and a start position of a resource block for transmitting the SSB is the same as or different from an offset that is in a BWP to which the second beam belongs and that is between a start position of a resource block for transmitting the Common PDCCH and the start position of the resource block for transmitting the SSB; and
a time resource that is in the BWP to which the first SSB beam belongs and that is for transmitting the Common PDCCH is the same as or different from a time resource that is in the BWP to which the second SSB beam belongs and that is for transmitting the Common PDCCH.

8. A base station, comprising:
a processor; and
a memory coupled to the processor, wherein the memory comprise instructions that, when executed by the processor, the first base station perform operations comprising:
determining at least one target traffic beam that covers an area and has a data channel quality of at least one terminal that is higher than a first threshold and a broadcast channel quality that is lower than a second threshold; and
transmitting, N first synchronization resource block (SSB) beams in at least one bandwidth part (BWP), wherein the N first SSB beams cover the area covered by the at least one target traffic beam, and N is an integer greater than or equal to 1.

9. The base station according to claim 8, wherein the at least one target traffic beam comprises a first target traffic beam and the at least one terminal comprises N terminals, for the first target traffic beam, the base station performs data transmission with the N terminals by using the first target traffic beam, a ratio of a quantity of the N terminals where the data channel quality is higher than the first threshold to K is greater than a first preset ratio, and a ratio of a quantity of the N terminals where the broadcast channel quality is lower than the first threshold to K is greater than a second preset ratio, wherein K is an integer greater than or equal to 1.

10. The base station according to claim 9, wherein for the first target traffic beam, a ratio of a quantity of the N terminals that perform redirection and/or handover from a 5G network to a 4G network to K is greater than a third preset ratio.

11. The base station according to claim 8, wherein the data channel quality is represented by an uplink reference signal (SRS) measurement result, and the broadcast channel quality is represented by an SSB measurement result.

12. The base station according to claim 11, wherein the SRS measurement result comprises at least one of an SRS reference signal received power (RSRP) and an SRS signal to interference plus noise ratio (SINR), and wherein:
the SSB measurement result comprises an SSB RSRP.

13. The base station according to claim 12, wherein:
at least one second SSB beam and the N first SSB beams do not completely overlap on a frequency domain resource; and
the SSB measurement result comprises a measurement result of the at least one second SSB beam.

14. The base station according to claim 13, wherein the first SSB beam is further used to transmit a common physical downlink control channel Common (PDCCH), and the second SSB beam is further used to transmit a Common PDCCH;
an offset that is in a BWP of the at least one BWP to which the first SSB beam belongs and that is between a start position of a resource block for transmitting the Common PDCCH and a start position of a resource block for transmitting the SSB is the same as or different from an offset that is in a BWP to which the second beam belongs and that is between a start position of a resource block for transmitting the Common PDCCH and the start position of the resource block for transmitting the SSB; and
a time resource that is in the BWP to which the first SSB beam belongs and that is for transmitting the Common PDCCH is the same as or different from a time resource that is in the BWP to which the second SSB beam belongs and that is for transmitting the Common PDCCH.

* * * * *